3,401,152
POLYELECTROLYTES FROM BIS
SULFONIUM SALTS
Ritchie A. Wessling, Midland, and Ray G. Zimmerman, Shepherd, Mich., assignors to The Dow Chemical Company, Midland, Mich., a corporation of Delaware
No Drawing. Filed Nov. 3, 1966, Ser. No. 591,706
8 Claims. (Cl. 260—78.4)

This invention relates to novel water-soluble polyelectrolytes derived from bis sulfonium compounds. More specifically it relates to water-soluble polyelectrolytes having units of the structure

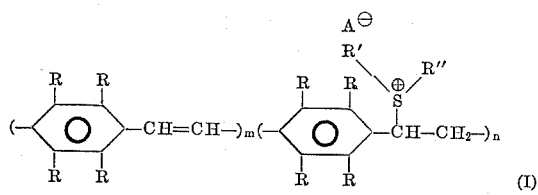

wherein R represents hydrogen or a methyl group, R' and R" each represents an alkyl group containing from 1 to 4 carbon atoms and A represents a counterion which can be derived from any low molecular weight acid so long as it does not precipitate polymer or react with polymer in an aqueous solution. Suitable low molecular weight acids from which the counterion A can be derived include both inorganic acids such as hydrohalic acids which provide a halide ion, e.g., chloride or bromide ion, and carbonic acid which provides a bicarbonate ion, and organic acids such as acetic, propionic, butyric, maleic, citric, or oxalic acid. The ratio of the units comprising the polyelectrolyte structure in a random grouping is represented by the integers $m$ and $n$ in which the ratio $m:n$ ranges from about 1:10 to about 3:1 or to the ratio corresponding to the point of incipient water insolubility.

By suitable techniques, a polyelectrolyte having a structure wherein $m$ equals zero can be prepared. However, because the sulfonium group is easily eliminated in the subsequent isolation step, the polyelectrolyte solution becomes fluorescent indicating the formation of the unsaturated structural unit.

The compositions of this invention are useful in various applications, particularly as a chemical intermediate, and as an ultraviolet light absorber when cast as a film over the material to be protected, and as a dye for cellulosic materials.

In accordance with this invention it has been discovered that a novel polyelectrolyte having recurring units of the type described above can be prepared by polymerizing in a strongly basic solution monomeric sulfonium salts having the formula

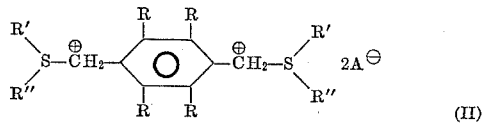

wherein R, R', R" have the same meanings as their counterparts heretofore mentioned in the general Formula I for the polyelectrolyte, and A is a counterion which will form a stable salt with the cation in Formula II such as a chloride, bromide, or bicarbonate ion. The counterion A in the starting monomeric salt can have the same meaning as its counterpart in the polyelectrolyte of Formula I, but does not necessarily include all of the same ions suitable therefore because a counterion suitable in the polyelectrolyte can be put there by a variety of techniques including ion exchanging and dialysis.

Monomeric sulfonium salts which can be used in preparing the compositions of the invention include p-phenylene dimethlyene bis(dimethyl sulfonium chloride); 2,5-dimethyl-p-phenylene dimethylene bis(dimethyl sulfonium chloride); p-phenylene dimethylene bis(diethyl sulfonium chloride); p-phenylene dimethylene bis(dipropyl sulfonium chloride); p-phenylene dimethylene bis(di-n-butyl sulfonium chloride-; 2,3,5,6-tetramethyl-p-phenylene dimethylene bis(dimethyl sulfonium chloride); p-phenylene dimethylene bis(methyl butyl sulfonium chloride); 2,5-dimethyl-p-phenylene dimethylene bis(diethyl sulfonium chloride); p-phenylene dimethylene bis(diethyl sulfonium bicarbonate); p-phenylene dimethylene bis(diethyl sulfonium bromide); and 2.5-dimethyl-p-phenylene dimethylene bis(diethyl sulfonium bicarbonate).

The monomeric sulfonium salts polymerize to form novel polyelectrolytes in a strongly basic solution having a pH of 11 or greater. Any basic source of hydroxide ions can be used including sodium hydroxide, potassium hydroxide, calcium hydroxide, a quaternary ammonium hydroxide, a sulfonium hydroxide, a strongly basic ion exchange resin in its hydroxide form, and the like. The preferred solvent is water in order to obtain high polymerization rates. However, a suitable solvent can also be a mixture of water and a non-aqueous organic solvent which is compatible with water and does not react with or precipitate the sulfonium salt such as methanol, dioxane, benzyl alcohol, tetrahydrofuran, and ether.

Isolation of the polyelectrolyte product is carried out by quenching the polymerization reaction with acid and dialyzing the reaction mixture.

An alternate procedure is to ion exchange the monomeric sulfonium salt to the hydroxide form, allow the salt to polymerize, then quench the reaction mixture with acid.

The sulfide, R'—S—R", is eliminated during the polymerization reaction and should be removed from the aqueous phase as it is formed to get rapid polymerization. Production of high molecular weight polyelectrolytes is favored by low temperatures, high concentrations of sulfonium ions and hydroxide ions, and the substantial exclusion of oxygen from the reaction mixture. The pendant sulfonium groups on the polyelectrolyte also react with hydroxide ions but at a slower rate than the polymerization reaction. In order to reduce the extent of this side reaction and produce a high concentration of sulfonium groups in the polyelectrolyte, the polymerization is preferably carried out at low temperatures, e.g., not more than about 25°C. For the same reason, a large excess of base should not be used in the reaction. Reactions using one equivalent of base per sulfonium group in the salt are preferred. The solution of polyelectrolyte should be protected from ultraviolet light, heat, and strongly basic conditions.

The polyelectrolyte solution has a viscosity ranging from a highly viscous gel to a mobile liquid. The viscosity of the solution will depend on concentration, molecular weight and the number of ionic groups per polymer chain.

The following non-limiting examples serve to illustrate the invention.

Example I 100 cc. each of 0.2 N sodium hydroxide and 0.2 N p-phenylene dimethylene bis(diethyl sulfonium chloride) was cooled to 0° C. and flushed thoroughly with nitrogen. The solutions were mixed together with stirring. The reactor was continuously flushed with nitrogen. After 20 minutes (43.3 percent reaction), the polymerization reaction was quenched by adding 1 N hydrochloric acid solution precooled to 0° C. The neutralized solution was dialyzed against deionized water to remove the reaction by-product, sodium chloride, as well as unreacted monomeric sulfonium salt, and low molecular weight polymer.

The dialyzed solution was clear, viscous and showed blue fluorescence under ultraviolet excitation. The polyelectrolyte product contained 7.47 milliequivalents of sulfonium chloride groups (54 percent yield of polyelectrolyte).

The water-soluble polyelectrolyte was calclulated before drying to have recurring units of the structure

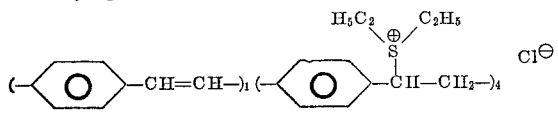

Example II

Preparation of the novel polyelectrolyte from 2,5-dimethyl-p-phenylene dimethylene bis(diethyl sulfonium chloride).

100 cc. each of 0.2 N sodium hydroxide and 0.2 N sulfonium salt was cooled to 0° C. and flushed thoroughly with nitrogen. The solutions were mixed together rapidly with stirring. The reactor was continuously flushed with nitrogen. After 28 minutes (48.4 percent reaction as determined by the amount of hydroxide ion consumed after titration), the polymerization reaction was quenched by adding 1 N hydrochloric acid solution precooled to 0° C. The neutralized solution was a viscous syrup with a bluish tint and showed violet fluorescence under ultraviolet excitation.

Paper is treated with the polyelectrolyte solution and dried at a temperature between 50° and 100° C. to give a yellow color and, when under ultraviolet excitation, a blue fluorescence. For treating porous substrates such as paper, cloth and the like, it is not necessary to remove the reaction by-product, the sodium chloride salt, because it can be washed out subsequently. However, if it is desired to cast a film with the polyelectrolyte, the neutralized solution should be dialyzed as in Example I.

Before drying the polyelectrolyte was determined to have recurring units of the structure

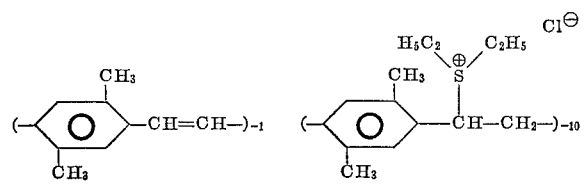

Example III

Preparation of polyelectrolyte from p-phenylene dimethyl bis(diethyl sulfonium chloride) by reaction with ion exchange beads.

100 cc. of 0.1 N sulfonium salt in an eight ounce bottle was cooled to 0° C. and flushed with nitrogen. Added thereto were 30.2 grams of cold beads of a quaternary ammonium strong base anion exchange resin in the base or hydroxide form, e.g., a resinous polymeric vinylbenzyl trimethylammonium hydroxide cross-linked with a conventional cross-linking agent such as divinylbenzene. Such ion exchange resins are well known in the art as disclosed in U.S. Patents 2,591,573 and 2,614,099. The bottle containing the ion exchange beads and the monomeric sulfonium salt was shaken thoroughly and held for one hour (50 percent reaction as determined by the amount of hydroxide ion consumed). The viscous solution was neutralized with 1 N hydrochloric acid precooled to 0° C. and the beads filtered off. A portion of this polyelectrolyte solution is then cast on a glass substrate at a temperature of 55° C. to yield a hard, clear, transparent yellow-green film. The film transmits visible light but is opaque to ultraviolet light.

A cellulosic material such as paper or cotton is treated with another portion of the polyelectrolyte solution. The specimen is dipped into the syrupy solution, the excess being sponged off. The specimen is then heated at a temperature of about 100° C. for 10 minutes. This treatment dyes the cellulosic material yellow, and, when exposed to ultraviolet light, it fluoresces blue-green.

Example IV

Preparation of polyelectrolyte from p-phenylene dimethylene bis(di-n-butyl sulfonium chloride).

100 cc. each of 0.1 N sodium hydroxide and 0.1 N sulfonium salt were mixed together at room temperature. After two minutes (55.5 percent reaction as determined by the amount of hydroxide ion consumed), the polymerization reaction was quenched by adding 1 N hydrochloric acid. The polyelectrolyte solution was viscous and cloudy. The cloudiness of the solution was due to the insolubility of n-butyl sulfide which was eliminated during the reaction.

This solution is used to treat paper. After dipping and drying, the paper specimen is light yellow in color, shows blue fluorescence under ultraviolet excitation, and exhibits improved wet strength.

Example V 0.5 N p-phenylene dimethylene bis(dimethyl sulfonium chloride) was passed through an ion exchange column containing resin similar to that described in Example III at a temperature of 0° C. A foamy, pale yellow-green syrup is eluted which shows a blue fluorescence under ultraviolet excitation. The syrup was maintained at 0° C. and slowly turned yellow and thickened. After reacting for two hours, the syrup was cast on a steel plate and air dried. The residue was a green, tacky deposit. Air drying at 100° C. converted it to a hard, yellow, smooth coating showing blue fluorescence under ultraviolet excitation. This example shows the polyelectrolyte having an hydroxide counterion.

Example VI

Preparation of polyelectrolyte containing the maleate counterion.

Syrup was prepared in the same manner as Example V and reacted for two hours at 0° C. and then neutralized with maleic acid. The resulting bright yellow polyelectrolyte solution was cast on a glass plate and air dried at room temperature followed by curing at 100° C. The product is a tough, bright yellow film showing strong green fluorescence under ultraviolet excitation.

The syrup obtained by the ion exchange experiments was applied to a variety of other substrates, e.g., wood, paper, cotton, glass, asbestos, masonry and aluminum. The water-soluble polyelectrolyte exhibits a strong affinity for cellulosic materials, permanently dyeing them on contact. The dye-reaction took place just as readily with a neutralized solution containing sodium chloride. For reasons which are not fully understood, the color at the time of contact does not change with time. The original dyeing solution, however, gradually darkens. This indicates a reaction between the cellulose and the intermediate polymer which prevents further development of conjugation. Attempts to separate the polymer mixture by chromatography also indicates reaction or at least a very strong physical adsorption. When a spot of neutral solution was applied to Whatman #1 filter paper, only small amounts of material with blue fluorescence migrated. The rest was fixed at the application point and could not be removed by water extraction. Exposure to strong ultraviolet light or heat produced a dark yellow color, but even extended treatment did not produce darker colors.

Concentrated solutions, e.g., those above 0.25 N, of the sulfonium salts other than the dimethyl salt polymerize too rapidly to pass through the ion exchange column. The solutions gel on the column and cannot be eluted. This problem can be overcome however by adding dimethyl sulfide to the column. In addition, ion exchanging at low temperatures, e.g., below about 15° C. is necessary in order to control the polymerization reaction. At higher temperatures the reaction mixture plugs the column and/or is converted to polyelectrolyte containing few sulfonium groups. This problem too can be overcome by adding dimethyl sulfide to the column. See Example XI below.

Example VII

Preparation of polyelectrolyte with chloride counterions from p-phenylene dimethylene bis(dimethyl sulfonium chloride).

50 cc. each of 4 N sodium hydroxide and 1 N sulfonium salt were cooled to 0° C. and mixed together. After two hours (37 percent reaction) a yellow gel was obtained. The gel was dispersed in 1 N hydrochloric acid in a Waring Blendor. The acid solution was dialyzed in 45 A. poresize regenerated cellulose tubing for 72 hours against deionized water.

The yield was 1300 cc. of viscous yellow polyelectrolyte solution which contained approximately 0.01 percent solids and a sulfonium ion concentration of 0.0084 N. The solution was concentrated to about one percent solids and 0.1 N sulfonium ion concentration, then cast on glass plate. Air drying at 60° C. yielded a tough yellow transparent film showing intense green fluorescence under ultraviolet excitation.

Example VIII

Preparation of polyelectrolyte with bicarbonate counterions from p-phenylene dimethylene bis(dimethyl sulfonium chloride).

The recipe was the same as in Example VII before quenching with hydrochloric acid. The reaction mixture was quenched with powdered solid carbon dioxide and dialyzed against carbon dioxide-saturated water. The concentration of bicarbonate ion was determined by acid titration. Yields were equivalent to those in Example VII. After casting the polyelectrolyte solution on glass plate, the sample was air dried at 60° C. to yield a hard yellow film showing intense green fluorescence under ultraviolet excitation.

Example IX

Preparation of polyelectrolyte with maleate counterions from p-phenylene dimethylene bis(dimethyl sulfonium chloride).

The recipe was the same as in Example VII before quenching with hydrochloric acid. The reaction mixture was quenched with 1 N maleic acid to yield a yellow precipitate. The mixture was dialyzed against deionized water giving a yellow-green solution containing excess carboxyl groups. After concentration to one percent solids, the polyelectrolyte solution was cast on various substrates, such as glass and metal plates, and air dried at 60° C. to yield a tough yellow coating showing green fluorescence under ultraviolet excitation.

Example X

This example illustrates the use of an extractant to increase the rate of polymerization of the bis dimethyl sulfonium salt which is normally slower than other dialkyl derivatives.

100 cc. each of 0.1 N sodium hydroxide and 0.1 N p-phenylene dimethylene bis(dimethyl sulfonium chloride) were mixed together at room temperature. After 10 minutes, 22 percent of the sodium hydroxide was consumed. The polyelectrolyte solution was light yellow-green and of low viscosity.

For comparative purposes, the same recipe used above was followed except for adding an equal volume of benzene. 54.8 percent of the sodium hydroxide was consumed. The polyelectrolyte solution was a colorless mixture of high viscosity.

As a further comparison, the same recipe used above was initially followed except for using the di-n-butyl and the diethyl salts respectively. After 10 minutes, 58 percent of the sodium hydroxide was consumed in the case of the di-n-butyl salt, and 62 percent in the case of the diethyl salt.

Example XI

A glass column was filled with a strong base anion exchange resin of the type described in Example III which was then saturated with a 50:50 mixture of dimethyl sulfide and water just prior to passing 0.2 N p-phenylene dimethylene bis(dimethyl sulfonium chloride) through the column. In addition, the sulfonium salt was saturated with dimethyl sulfide before being run through the column.

The material coming out of the ion exchange column was collected in a receiver under an argon atmosphere. It was a transparent liquid at this point and not a yellow syrup as it is when collected off an unsaturated column. The collected product was stripped in a Rinco evaporator to remove the excess dimethyl sulfide. The stripping was carried out at about 17° C. and took five minutes. Samples of the material were then titrated periodically over a 50-minute period until the normality of the material reached 0.096. Thereafter, polyelectrolyte derivatives having the following counterions were prepared: (a) the chloride ion—by quenching a portion of the material with 1 N hydrochloric acid; (b) the bicarbonate ion—by quenching a portion of the material with powdered carbon dioxide; (c) the maleate ion—by quenching a portion of the material with maleic acid; (d) the hydroxide ion at 0.096 N, i.e., a portion of the material itself and (e) the acetate ion—by quenching a portion of the material with 1 N acetic acid.

The following applications were made from the polyelectrolyte solutions above: casting films on glass plates—yellow films; treating paper by dipping—yellow color; and treating cotton fiber by dipping—yellow color. The samples were cured at 60° C. for 30 minutes. They fluoresced blue-green under ultraviolet excitation.

The cotton fiber samples were washed with soap at 80° C. for 30 minutes with all the samples still retaining the color that they started with as well as remaining fluorescent. No color or fluorescence appeared in the soap solution.

The paper samples dried a yellow color and fluoresced blue-green. The color could not be removed by water extraction.

The glass plate or slide samples were checked for ultraviolet transmission by the following technique. A glass slide containing one of the films cast on it was placed over an ultraviolet light source and checked for ultraviolet transmission by holding a standard sample of known fluorescence above the glass slide. No fluorescence was observed in the standard.

We claim:

1. A water-soluble polyelectrolyte having recurring units of the structure

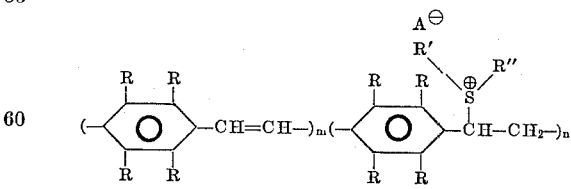

wherein R represents hydrogen or the methyl group, R' and R" each represents an alkyl group containing from 1 to 4 carbon atoms, A represents a counterion and $m$ and $n$ are integers which show the ratio of the respective units in the recurring structure, the ratio of $m$ to $n$ ranging from about 1 to 10 to about 3 to 1 or to the ratio corresponding to the point of incipient water insolubility.

2. The polyelectrolyte of claim 1, wherein R represents hydrogen, R' and R" each represents an ethyl group, and A represents a chloride counterion.

3. The polyelectrolyte of claim 2, wherein the ratio of $m$ to $n$ is about 1 to 4.

4. The polyelectrolyte of claim 1, wherein R represents hydrogen, R' and R" each represent a methyl group, and A represents a chloride counterion.

5. The polyelectrolyte of claim 4, wherein A represents a maleate counterion.

6. The polyelectrolyte of claim 4, wherein R' and R" each represents an n-butyl group.

7. The polyelectrolyte of claim 1, wherein the sum of the R's represents dimethyl in the 2,5 positions on the aromatic ring, R' and R" each represents an ethyl group, and A represents a chloride counterion.

8. A process for producing the water-soluble polyelectrolyte of claim 1 comprising reacting a monomeric sulfonium salt having the formula

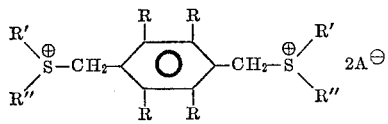

wherein R represents hydrogen or the methyl group, R' and R" each represents an alkyl group containing from 1 to 4 carbon atoms, and A represents a counterion, with hydroxide ions in an aqueous solution.

References Cited
UNITED STATES PATENTS 3,110,687    11/1963    Smith.
3,238,276    3/1966    La Combe _____ 260—79.7

JOSEPH L. SCHOFER, *Primary Examiner.*

D. K. DENENBERG, *Assistant Examiner.*